United States Patent
Villarino Villa et al.

(10) Patent No.: US 10,353,917 B2
(45) Date of Patent: Jul. 16, 2019

(54) METHOD AND APPARATUS FOR ANALYZING A TRANSMISSION SIGNAL

(71) Applicant: Rohde & Schwarz GmbH & Co. KG, München (DE)

(72) Inventors: Ruben Villarino Villa, München (DE); Martin Leibfritz, Aying (DE); Ulrich Tuerk, München (DE); Thilo Bednorz, Erding (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 174 days.

(21) Appl. No.: 15/443,035

(22) Filed: Feb. 27, 2017

(65) Prior Publication Data

US 2017/0272431 A1    Sep. 21, 2017

(30) Foreign Application Priority Data

Mar. 18, 2016    (EP) .................................... 16161179

(51) Int. Cl.
| | |
|---|---|
| *G06F 16/25* | (2019.01) |
| *H04L 29/06* | (2006.01) |
| *H04B 3/46* | (2015.01) |
| *G01R 31/317* | (2006.01) |
| *H04B 17/23* | (2015.01) |
| *H04B 17/26* | (2015.01) |
| *H04B 17/309* | (2015.01) |
| *H04B 17/00* | (2015.01) |

(52) U.S. Cl.
CPC ....... *G06F 16/258* (2019.01); *G01R 31/3171* (2013.01); *H04B 3/46* (2013.01); *H04B 17/23* (2015.01); *H04B 17/26* (2015.01); *H04B 17/309* (2015.01); *H04L 63/0861* (2013.01); *H04B 17/00* (2013.01)

(58) Field of Classification Search
CPC ..... H04L 63/0861; G01R 13/00; G01R 31/00; G01R 31/3171; G06F 17/30569; G06F 16/258; H04B 3/46; H04B 17/00; H04B 17/23; H04B 17/26; H04B 17/309
USPC ............................................................ 726/6
See application file for complete search history.

(56) References Cited

U.S. PATENT DOCUMENTS 3,705,383 A * 12/1972 Frayer ................ G01N 15/1468
377/10
4,495,585 A * 1/1985 Buckley ................ G01R 23/16
345/40
(Continued)

FOREIGN PATENT DOCUMENTS

| WO | 9211709 | 7/1992 |
|---|---|---|
| WO | 03098844 A1 | 11/2003 |
| WO | WO 2007/041808 A1 | 4/2007 |

OTHER PUBLICATIONS

Communication of the extended European search report for European Application No. 16161179.3 (Mar. 8, 2017).
(Continued)

*Primary Examiner* — Shahriar Zarrineh
(74) *Attorney, Agent, or Firm* — Shumaker & Sieffert, P.A.

(57) ABSTRACT

A measurement device comprising a measurement unit adapted to measure a transmission characteristic for providing an eye pattern; and a conversion unit adapted to convert automatically the eye pattern into a character separated values, CSV, file.

19 Claims, 9 Drawing Sheets

(56) References Cited

U.S. PATENT DOCUMENTS

| | | | | |
|---|---|---|---|---|
| 5,047,930 | A * | 9/1991 | Martens | A61B 5/0476 128/920 |
| 5,233,545 | A * | 8/1993 | Ho | G06F 17/18 377/13 |
| 5,418,789 | A * | 5/1995 | Gersbach | H04L 1/20 375/224 |
| 6,026,139 | A * | 2/2000 | Hady | G06F 11/348 377/13 |
| 6,700,369 | B1 * | 3/2004 | Makuuchi | G01R 33/1207 324/212 |
| 6,845,178 | B1 * | 1/2005 | Evans | G06T 7/001 250/559.39 |
| 6,965,736 | B1 * | 11/2005 | Hanik | H04B 10/07953 398/14 |
| 9,177,225 | B1 * | 11/2015 | Cordova-Diba | G06T 5/00 |
| 2002/0039441 | A1 * | 4/2002 | Klassen | H04N 1/64 382/166 |
| 2003/0016770 | A1 * | 1/2003 | Trans | H04B 1/00 375/346 |
| 2004/0078157 | A1 * | 4/2004 | Montijo | G01R 13/345 702/66 |
| 2004/0151403 | A1 * | 8/2004 | Scheier | G06F 3/002 382/325 |
| 2004/0175176 | A1 | 9/2004 | Lo | |
| 2004/0212618 | A1 * | 10/2004 | Palmer | G06F 17/211 345/440 |
| 2006/0018374 | A1 | 1/2006 | Nelson et al. | |
| 2006/0064274 | A1 * | 3/2006 | Goebel | B60T 8/171 702/145 |
| 2009/0028554 | A1 * | 1/2009 | Anderson | H04L 7/0054 398/25 |
| 2009/0128187 | A1 * | 5/2009 | Barford | G01R 13/0272 326/39 |
| 2009/0243792 | A1 * | 10/2009 | Chmelar | G06F 7/588 340/5.6 |
| 2011/0135299 | A1 | 6/2011 | Skoog et al. | |
| 2012/0166140 | A1 * | 6/2012 | Weber | G06F 17/18 702/180 |
| 2012/0280844 | A1 * | 11/2012 | Abe | H04B 10/60 341/118 |
| 2014/0086291 | A1 * | 3/2014 | Asmanis | H04B 17/12 375/224 |
| 2015/0131887 | A1 * | 5/2015 | Racine | G06F 19/26 382/133 |
| 2015/0226801 | A1 * | 8/2015 | Hopkins | G01R 31/31705 714/731 |
| 2015/0271037 | A1 * | 9/2015 | Wiley | H04B 3/462 370/252 |
| 2015/0358090 | A1 * | 12/2015 | Mactaggart | G01R 31/3171 375/224 |
| 2017/0121373 | A1 * | 5/2017 | Cortes-Garcia | G01N 33/56983 |

OTHER PUBLICATIONS

"Operator's Manual," Wave Surfer 10, Oscilloscopes, Teledyne Lecroy, 924609 Rev A., pp. 1-120 (Oct. 2014).

"Operator's Manual," LeCroy, 9300C Series, Digital Oscilloscopes, LeCroy Corporation, Revision A, 273 pages (Jan. 1998).

Examination Report from counterpart European Application No. 16161179.3, dated Mar. 7, 2018, 6 pp.

Response to European Office Action, from counterpart European Application No. 16161179.3, dated Jan. 28, 2018, 25 pp.

Search Report from counterpart European Application No. 16161179. 3, dated Mar. 7, 2018, 6 pp.

* cited by examiner

Fig. 5

```
1   # Eye Diagram Trace
2   # Version 1.00
3   # X-Axis [s], 5 Points
4   # Y-Axis [V], 4 Points
5   ; -1.0e-009; -0.5e-009; 0.0 ; 0.5e-009;1.0e-009
6   1.00; 0; 0; 0; 0; 0
7   0.75; 95; 50; 99; 49; 94
8   0.50; 0; 49; 0; 51; 0
9   0.25; 93 ;51; 98; 53; 96
10
```

METHOD AND APPARATUS FOR ANALYZING A TRANSMISSION SIGNAL

PRIORITY CLAIM

This application claims the benefit of European Application No. 16161179.3, filed Mar. 18, 2016; the disclosure of which is incorporated herein by reference in its entirety.

TECHNICAL FIELD

The invention relates to a method and apparatus for analyzing a transmission signal on the basis of an eye pattern of the transmission signal.

TECHNICAL BACKGROUND

An eye pattern or eye diagram is a commonly used diagram type used in measurement devices like oscilloscopes or network analyzers. An eye diagram can also be used for simulating digital transmissions systems. An eye diagram shows a data signal spanning a sequence of symbols transmitted in a physical transmission channel. An eye diagram is a common indicator of the quality of signals transmitted through a transmission channel. An oscilloscope generates an eye diagram by overlaying sweeps of different segments of a long data stream at a clock rate. When many signal transitions of a transmission signal are overlaid positive and negative pulses are superimposed on each other. Overlaying many bits produces the eye diagram, so-called because the resulting image looks like the opening of a human eye.

In a conventional measurement device, the generated eye diagram or eye pattern can be displayed on a screen of the measurement device to an engineer. The engineer can then evaluate a system performance of the transmission system on the basis of the visualized eye diagram. A user may print a screenshot of the eye pattern displayed on the display unit of the measurement device. With a conventional measurement device, it is not possible to perform an automatic analysis of the eye pattern of the measured transmission signal. A user or engineer can interpret the visualized eye diagram to draw conclusions concerning the quality of the transmission channel, however, further processing of the eye diagram to analyze the transmission signal automatically is not possible.

Accordingly, there is a need to provide a measurement device which allows an automatic analysis of an eye pattern of a transmission signal.

SUMMARY OF THE INVENTION

The invention provides according to the first aspect a measurement device comprising a measurement unit adapted to measure a transmission characteristic for providing an eye pattern; and a conversion unit adapted to convert automatically the eye pattern into a character separated values, CSV, file.

In a possible embodiment of the measurement device according to the first aspect of the present invention, the measurement device comprises a data interface adapted to export the CSV file provided by said conversion unit and/or to import a CSV file received from another device.

In a possible embodiment of the measurement device according to the first aspect of the present invention, the CSV file provided by said conversion unit comprises a body containing a histogram representing the eye pattern and a header containing information about the CSV file and its body.

In a possible embodiment of the measurement device according to the first aspect of the present invention, the eye pattern provided by said conversion unit comprises a plurality of superimposed signal traces of a measured transmission signal or of a simulated or synthesized signal.

In a further possible embodiment of the measurement device according to the first aspect of the present invention, the measurement device comprises a display unit adapted to draw the eye pattern on a screen in a drawing area divided in equally spaced bins of a two-dimensional histogram.

In a further possible embodiment of the measurement device according to the first aspect of the present invention, each bin of said two-dimensional histogram is represented by a counter value representing an occurrence frequency of signal traces of said transmission signal in the respective bin.

In a further possible embodiment of the measurement device according to the first aspect of the present invention, the body of the CSV file includes counter values of the two-dimensional histogram.

In a further possible embodiment of the measurement device according to the first aspect of the present invention, the header and the body of the CSV file provided by said conversion unit comprises text lines editable by a text editor.

In a further possible embodiment of the measurement device according to the first aspect of the present invention, the measurement device further comprises a processing unit adapted to process the CSV file for analyzing the eye pattern.

In a further possible embodiment of the measurement device according to the first aspect of the present invention, the measurement device comprises a memory unit adapted to store the CSV file provided by said conversion unit for further processing by a processing unit of said measurement device and/or for exporting the CSV file via the data interface of said measurement device.

In a further possible embodiment of the measurement device according to the first aspect of the present invention, the processing unit is adapted to compare automatically the CSV file provided by said conversion unit with a CSV file imported by said measurement device via the data interface of said measurement device from another device.

In a further possible embodiment of the measurement device according to the first aspect of the present invention, the processing unit is adapted to execute an application program processing the CSV file of the measured transmission signal to analyze a transmission signal and/or to analyze a transmission channel.

In a further possible embodiment of the measurement device according to the first aspect of the present invention, the measurement device comprises a probe adapted to tap a transmission signal from a physical transmission channel of a device under test.

The invention provides according to the second aspect a system comprising at least one measurement device according to the first aspect of the present invention adapted to export a CSV file to another device of said system and/or to import a CSV file from another device of said system.

In a possible embodiment of the system according to the second aspect of the present invention, the system comprises an analyzer connected to said measurement device adapted to analyze a transmission characteristic of a transmission signal and/or a transmission channel by processing an imported CSV file received from said measurement device.

In a possible embodiment of the system according to the second aspect of the present invention, the system further comprises a controller adapted to control an actor depending on the analyzing result provided by said analyzer to influence a measured transmission signal and/or a transmission channel.

The invention provides according to the third aspect a method for analyzing a transmission signal or a transmission channel comprising:

measuring the transmission characteristic to provide an eye pattern; and converting the provided eye pattern into a character separated values, CSV, file for further processing.

In a possible embodiment of the method according to the third aspect of the present invention, the CSV file comprises
a body containing a histogram representing the eye pattern and
a header containing information about the CSV file and its body.

BRIEF DESCRIPTION OF FIGURES

In the following, possible embodiments of the different aspects of the present invention are described in more detail with reference to the enclosed figures.

FIG. 5 shows a data structure of a simple exemplary character separated values, CSV, file as employed by the method and apparatus according to the present invention;

DETAILED DESCRIPTION OF EMBODIMENTS

Figure 1:
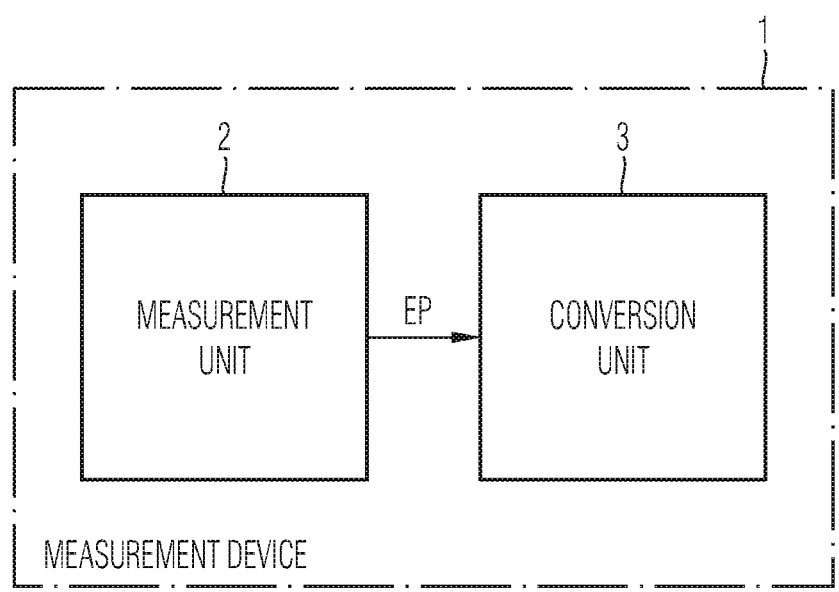
FIG. 1 shows a block diagram of a possible exemplary embodiment of a measurement device according to the first aspect of the present invention.
Figure 10:
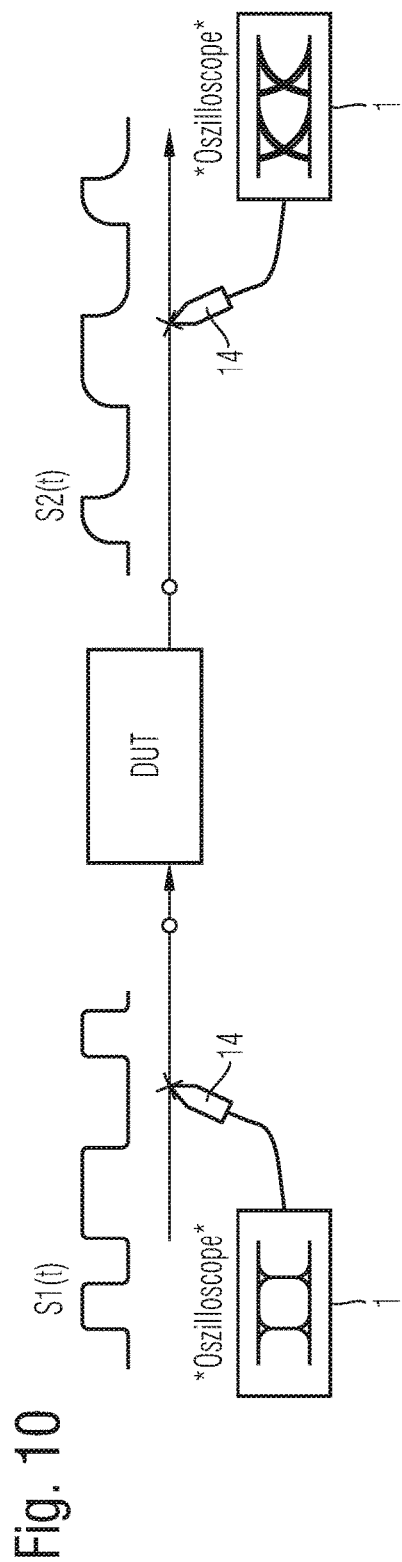
FIG. 10,11 illustrate possible embodiments of a measurement device according to the present invention.

As can be seen in FIG. 1, a measurement device 1 according to the first aspect of the present invention comprises in the illustrated exemplary embodiment of FIG. 1 a measurement unit 2 and a conversion unit 3. The measurement unit 2 of the measurement device 1 can be adapted to measure a transmission characteristic for providing an eye pattern EP of a transmission signal or transmission channel. The measurement unit 2 can be connected to a probe of the measurement device 1 which is adapted to tap a transmission signal from a physical transmission channel of a device under test DUT. The physical transmission channel can be a signal line or can comprise electronic components or devices under test DUT, for example a low pass filter LPF. The transmission signal can be for instance a serial or digital signal transported through a physical transmission channel such as an electrical or optical signal line. The measurement device 1 illustrated in FIG. 1 can be in a possible embodiment an oscilloscope as illustrated in FIG. 10.

Figure 11:
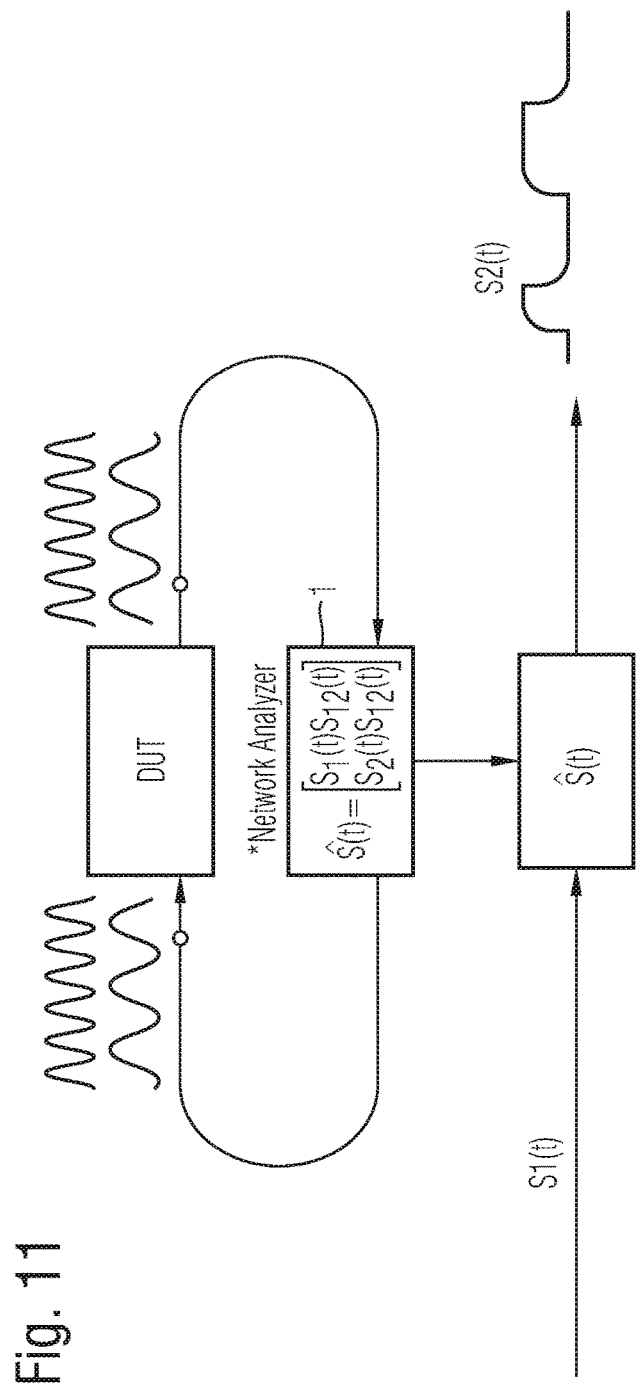

In a further possible embodiment, the measurement device 1 can be implemented by a network analyzer as illustrated in FIG. 11. The transmission signal can be a simulated or synthesized signal provided by the network analyzer.

The measurement unit 2 can generate in a possible embodiment an eye pattern EP of a measured transmission signal by overlaying sweeps of different segments of the transmission signal which can comprise a long data stream of bits driven by a master clock. The transmission signal can comprise a control signal and/or a data signal. The signal can span along a sequence of transmitted symbols. An eye pattern EP generated by the measurement unit 2 can be drawn on a display unit of the measurement device 1 from left to right by repetitively restarting the draw position on a left edge of trigger points. These trigger points are related to the data rate of the transmitted data signal. The measurement device 1 can trigger on the symbol transitions or based on a recovered clock signal. The same region in the drawing area on the screen of the display unit can be passed through between zero and an arbitrary number of times. The drawing area is divided in equally spaced bins. The resulting data structure is a two-dimensional histogram which resembles a pixel structure of a digital image. The eye pattern provided by the measurement unit 2 comprises in a possible EP embodiment a plurality of superimposed signal traces or curves of a measured or simulated transmission signal. The display unit is adapted to draw the eye pattern EP on a screen in a drawing area divided in equally spaced bins of a two-dimensional histogram. Each bin of the two-dimensional histogram is represented in a preferred embodiment by an integer counter value representing an occurrence frequency of signal traces of the transmission signal in the respective bin. Each histogram bin is represented by an integer counter value containing values from zero up to the largest supported positive value based on the underlying integer data representation. In a possible embodiment, a color mapping of the generated eye diagram or eye pattern EP can be performed wherein each range of bin values is assigned to a dedicated color. For instance, the value zero can be assigned to no color, i.e. a transparent area, while other values are drawn to the screen of the display unit using solid colors visible to a user. The user such as an engineer usually does not want only a visible picture on the screen of the display unit or a printout of the eye pattern, but wants to investigate the transmission signal further by performing additional analyzing steps.

The measurement device 1 according to the first aspect of the present invention comprises as illustrated in FIG. 1 a conversion unit 3 adapted to convert automatically the eye pattern EP provided by said measurement unit 2 into a character separated values, CSV, file or another ASCII data format. The CSV file comprises in a preferred embodiment a dots body containing a histogram representing the eye pattern EP and a header containing information or meta data about the CSV itself and its data body. The data body of the CSV file provided by the conversion unit 3 comprises fields including the counter values of the two-dimensional histogram separated by delimiters such as semicolons. The data structure of an exemplary symbol CSV file is illustrated in FIG. 5. The measurement device 1 can comprise a data interface adapted to export the provided CSV file of a transmission signal or of a transmission element to an external device for further processing. The data interface of the measurement device 1 can also be used to import a CSV file of a transmission signal and/or transmission element received from another device, for instance from another measurement device.

Figure 2:
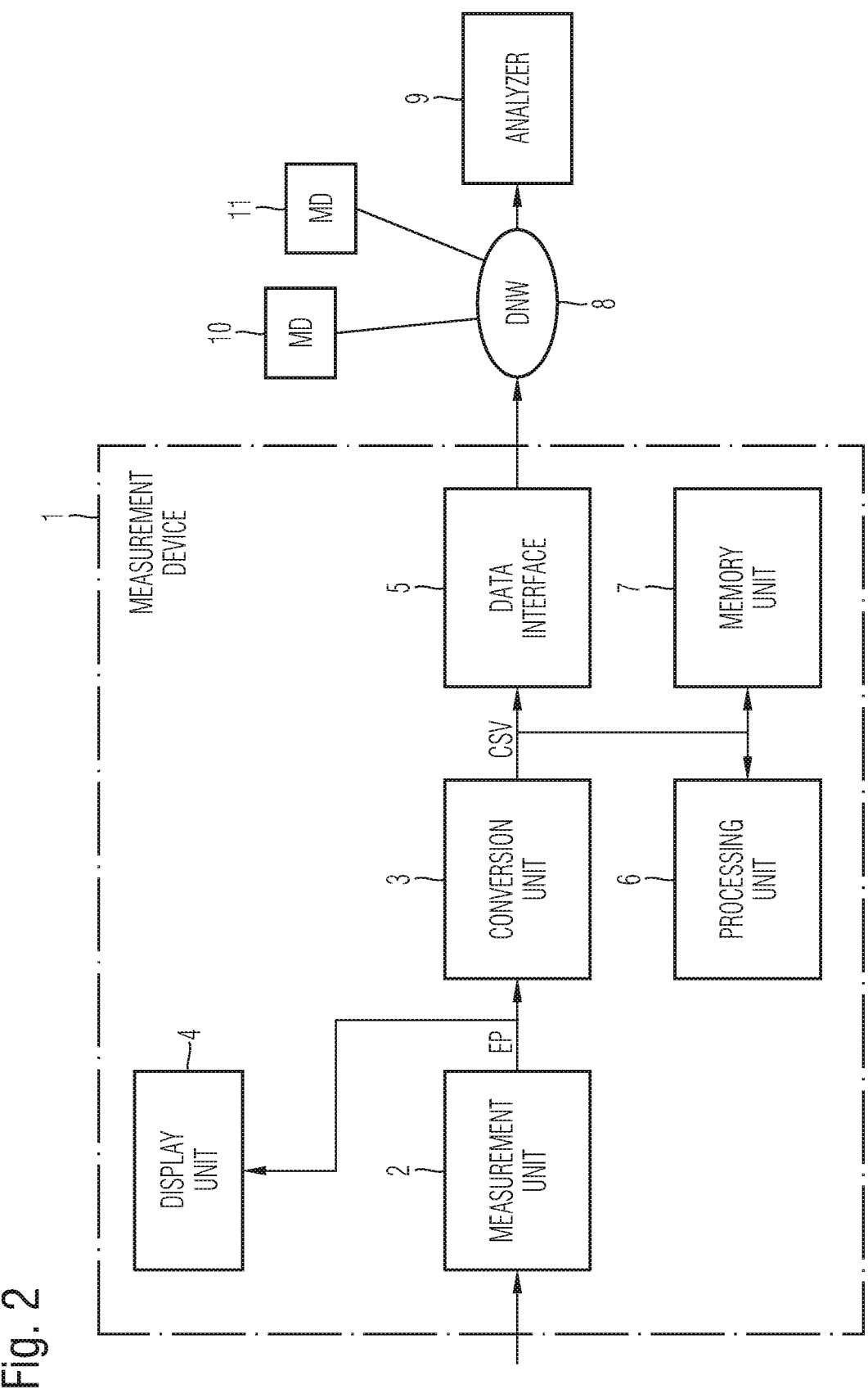
FIG. 2 shows a further block diagram for illustrating a possible exemplary embodiment of a measurement device according to the first aspect of the present invention.

FIG. 2 shows a block diagram of a possible exemplary embodiment of a measurement device 1 according to the first aspect of the present invention. In the illustrated embodiment, the measurement device 1 comprises a display unit 4. The display unit 4 is adapted to draw the eye pattern provided by the measurement unit 2 on a screen in a drawing area divided in equally spaced bins of a two-dimensional histogram. The CSV file generated by the conversion unit 3 can be supplied to a data interface 5 of the measurement device 1 to export the generated CSV file to an external processing unit for further processing of the CSV file. The CSV file provided by the conversion unit 3 can further be forwarded to an internal processing unit or processor 6 of the measurement device 1. The processing unit 6 is adapted to process the received CSV file for analyzing the measured transmission signal. In the illustrated embodiment of FIG. 2, the measurement device 1 further comprises an internal memory unit 7 adapted to store the provided CSV file of the measured transmission signal for further processing by the processing unit 6 of the measurement device 1 and/or for exporting the stored CSV file via the data interface 5 of the measurement device 1 to an external processing unit.

As illustrated in FIG. 2, the measurement device 1 can be connected by means of a data network 8 to an analyzer 9. The analyzer 9 can be configured to analyze the transmission signal by processing at least one imported CSV file of the transmission signal received from the measurement device 1 through the data network 8. As also illustrated in FIG. 2, other measurement devices 10, 11 can also be connected to the data network 8. The measurement devices 10, 11 can be similar in structure to the measurement device 1 as shown in FIG. 1 or 2. The measurement devices 1, 10, 11 of the system illustrated in FIG. 2 can for instance comprise oscilloscopes as shown in FIG. 10 and/or network analyzers as shown in FIG. 11. These measurement devices 1, 10, 11 can be used to measure the same or different transmission characteristics of transmission signals transported through the same or different transmission channels. In a possible embodiment, the measured transmission signal can comprise a reference signal or test signal generated by a test signal generator. The test signal can be applied to different measurement devices 1, 10, 11 of the system as illustrated in FIG. 2 to compare the measurement results provided by the measurement devices on the basis of the data contained in the data body of the converted CSV file of the measured test signal. The comparison of the measured transmission signals, e.g. test signal or test pattern, can be performed in a possible embodiment automatically by an analyzer 9 of the system. The comparison between different CSV files can be performed in a possible alternative embodiment also by a processing unit 6 integrated in a measurement device 1. The processing unit 6 of the measurement device 1 is adapted to compare in a possible implementation automatically the CSV file of the measured transmission signal provided by the conversion unit 3 of the measurement device 1 with a CSV file imported by said measurement device 1 through its data interface 5 from another device, in particular from another measurement device such as measurement devices 10, 11 as illustrated in FIG. 2. In a further possible embodiment, the processing unit 6 of the measurement device 1 can be configured to execute an application program in particular a spreadsheet application program processing the CSV file of the measured transmission signal and/or transmission channel and/or a CSV file imported from another device through the data interface 5 for analyzing the transmission signal and/or transmission channel measured by the measurement unit 2 of the measurement device 1 and/or for analyzing a transmission signal or transmission channel measured by a measurement unit of another measurement device and transported through the data network 8 via the data interface 5 to the processing unit 6 of the measurement device 1. The executed spreadsheet application program can be in a possible implementation an Excel application program. In a further possible embodiment, the analyzer 9 can comprise a processing unit which is also adapted to execute a spreadsheet application program processing CSV files received from the same or different measurement devices 1, 10, 11 via the data network 8. In a further possible embodiment, the measurements performed by the different measurement devices 1, 10, 11 of the system are performed synchronously and can be triggered by a master clock of the system.

Figure 3:
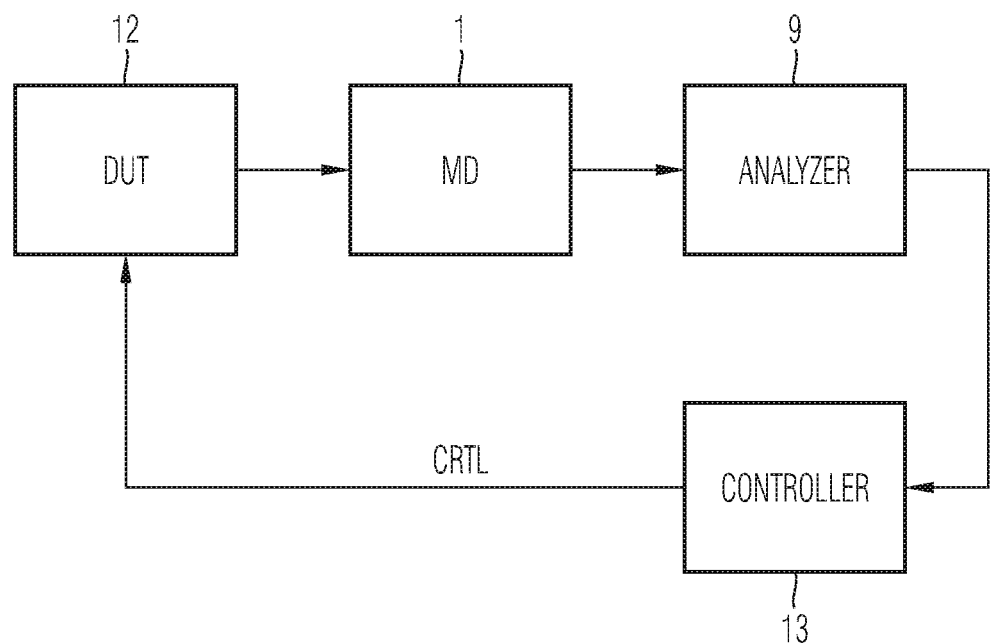
FIG. 3 shows a block diagram of a possible exemplary embodiment of a system according to a further aspect of the present invention.

FIG. 3 shows a further block diagram of a possible exemplary embodiment of a system according to a further aspect of the present invention. In the illustrated embodiment, the system comprises at least one measurement device 1 as illustrated in FIGS. 1, 2. The measurement device 1 is adapted to export at least one CSV file of a transmission signal to the analyzer 9. The analyzer 9 analyzes the transmission signal by processing the received imported CSV file of the respective transmission signal. As shown in FIG. 3, the measurement device 1 can comprise a probe adapted to tap the transmission signal from a physical transmission channel of a device under test 12 as shown in FIG. 3. The device under test 12 can be any electronic system comprising a physical transmission channel transporting a transmission signal. The transmission signal can be a wired or a wireless transmission signal. The device under test 12 can be for instance a printed circuit board PCB comprising signal lines connecting different electronic components with each other. A probe 14 of the measurement device 1 can tap a transmission signal from a test point of a signal line of the printed circuit board 12. The system as illustrated in FIG. 3 further comprises a controller 13 connected to the analyzer 9. In a possible embodiment, the controller 13 is adapted to control an actor depending on the analyzing result provided by the analyzer 9 to influence the measured transmission signal and/or a component of the transmission channel.

Figure 4:
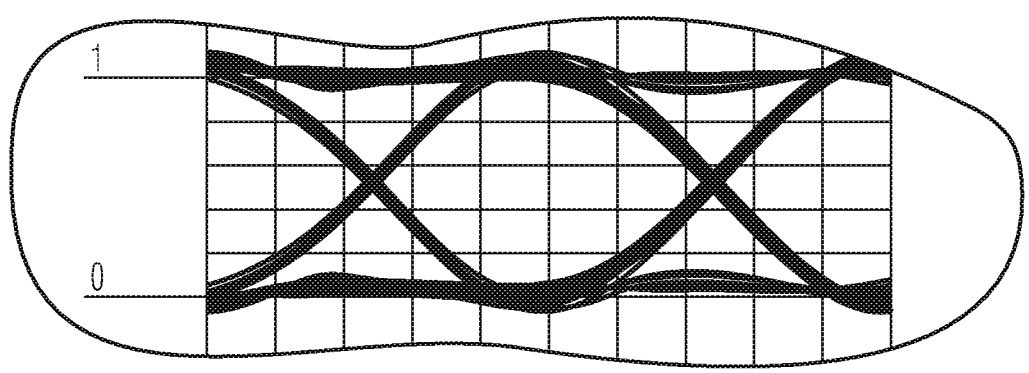
FIG. 4 shows a diagram of an exemplary eye pattern as employed by a method and apparatus according to the present invention.

FIG. 4 shows a diagram of an exemplary eye pattern or eye diagram provided by a measurement unit 2 of the measurement device 1 according to a first aspect of the present invention. The eye pattern comprises a plurality of superimposed signal traces of a transmission signal transported through a physical transmission channel. The display unit 4 of the measurement device 1 is adapted to draw the eye pattern as shown in FIG. 4 on a screen in a drawing area divided in equally spaced bins of a two-dimensional histogram. The transmission signal can be a baseband signal. The eye diagram indicates the quality of the transported transmission signal. The provided eye pattern can indicate a plurality of different eye parameters comprising an eye minimum, an eye maximum, an eye base, an eye top, an eye mean value, an eye amplitude, an eye height, an eye width, a bit period, a rise time, a fall time, a jitter peak-to-peak, a jitter RMS, a duty cycle distance, a crossing percentage, an opening factor or a signal-to-noise ratio SNR. A signal quality of the transmission signal can be analyzed on the basis of the eye appearance. An open eye pattern corresponds to a minimal signal distortion. The distortion of the signal waveform due to intersymbol interference and noise appears as closure of the eye pattern. By adjusting parameters of the investigated system or device under test 12, the controller 13 can improve the signal quality of the transmission signal, i.e. opening the eye diagram.

In a possible implementation, the adaption of a signal parameter of a transmission signal under control of the controller 13 on the basis of the CSV file of the transmission signal can be performed in realtime.

FIG. 5 shows an exemplary simple embodiment of a CSV data file used by the measurement device and method according to the present invention. The CSV file comprises a header containing information about the CSV file itself and its data body. The header comprises in the illustrated exemplary embodiment four lines starting with a hash sign. These lines contain basic information about the CSV file. In the illustrated embodiment, the first line indicates the name of the CSV file "Eye Diagram Trace". The second line contains the version number of the file's format. The third and fourth line define properties of the x-axis (time) and the y-axis (amplitude) The unit for both dimensions is given in brackets (time in seconds and amplitude in volts). Further, the number of points in each direction is given. This does facilitate to write the software code when importing the data of the CSV file. These values are referred to as row counter (for the number of points on the y-axis) and column counter (for the number of points on the x-axis).

Beside the header, the CSV file further comprises a data body. In the illustrated embodiment, the body starts with one text line describing the time axis (LINE 5). In a possible embodiment, the center of the time axis is assigned to the time 0 seconds. The left edge of the data is given by $T_s$ where $T_s=1/data\_rate$ representing the time duration of one symbol in on-off-keying. The right edge of the data is given by $+T_s$. The trigger point of the eye diagram is located by definition at $t=-T_s/2$.

Together, these definitions result in the typically used display where one complete data symbol of the transmission signal is located in the center of the diagram, and wherein half of a symbol is visible to the left of the center area, and the other half of the symbol is visible on the right side.

Thus, the line describing the x-axis shows values from $-T_s$ to $+T_s$. Since the time value for each column in the two-dimensional histogram is given, also non-equally spaced histogram bins can be represented.

In the illustrated example of the CSV file, the data for the x-axis starts at the second column of the CSV data structure. The first field in this line is empty since the first column is used for the following lines to represent the y-axis typically describing a voltage level of the measured signal.

Following the line with the x-axis data, as many lines as given by the row counter from the header are following. In the given example, LINE 6, 7, 8 and 9 represent the four lines for each row in the histogram. Each of these lines can start with the corresponding value for the y-axis (voltage level) given as a floating point value. Further following are the integer counter values for this row, in total as many as given by the column counter from the header of the CSV file.

Similar to the x-axis, each row is described with a corresponding value on the y-axis giving the freedom to represent the eye diagram with arbitrarily spaced bins in the y-direction. The CSV file can be terminated by a single empty line (LINE 10) as illustrated in FIG. 5.

The CSV file comprises a data format which can be imported into an application program in particular a spreadsheet software program. The data transported in the CSV file can be postprocessed using formulas of the spreadsheet application tool. In addition, reducing a zoom level of the spreadsheet can result in an ASCII-art style display of the eye diagram. It is possible to export the eye diagram into a spreadsheet tool by having a corresponding mime-type configured into the firmware of the measurement device 1. In a possible implementation, a simple drag-and-drop operation using for instance a mouse or a touchscreen allows to transfer the eye diagram or an eye diagram trace into the spreadsheet application program. The CSV file as illustrated in FIG. 5 can also be used for documentation of measurements for further processing by a software application program, in particular a spreadsheet application program. The CSV file can also be used exchanging data between different measurement devices. The ASCII-based text file format allows to store the data of a single eye diagram EP of a transmission signal. By reducing the optical display or view in a matrix or spreadsheet the eye pattern becomes recognizable as an ASCII graphical representation so that a further graphical representation such as a plot becomes redundant. The data body of the CSV file comprises fields including the counter values of the two-dimensional histogram separated from each other by delimiters such as a comma or a semicolon. These counter values represent an occurrence frequency of signal traces of the measured transmission signal.

Figure 6:
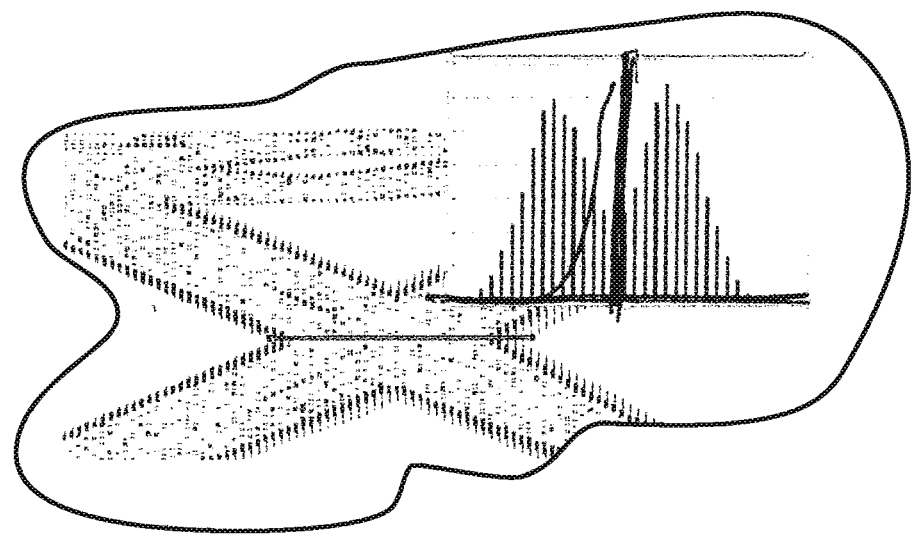
FIG. 6 shows a diagram for illustrating a possible data analysis which can be performed by a method and apparatus according to the present invention.

FIG. 6 shows a schematic diagram for illustrating a possible data analysis performed using a CSV file of a transmission signal. In the illustrated embodiment, a signal transition of the transmission signal is evaluated. In the given example, time variations of zero crossing are evaluated. The CSV file allows to analyze this signal parameter of the transmission signal automatically, for instance by calculating an occurrence frequency as illustrated in FIG. 6. A perfect transmission signal would cause a single peak in the middle as illustrated in the diagram of FIG. 6. A real transmission signal as measured by the measurement device 1 leads to a distribution profile as shown in FIG. 6. The calculated distribution profile can be further analyzed to investigate the signal parameters of the transmission signal.

Figure 7:
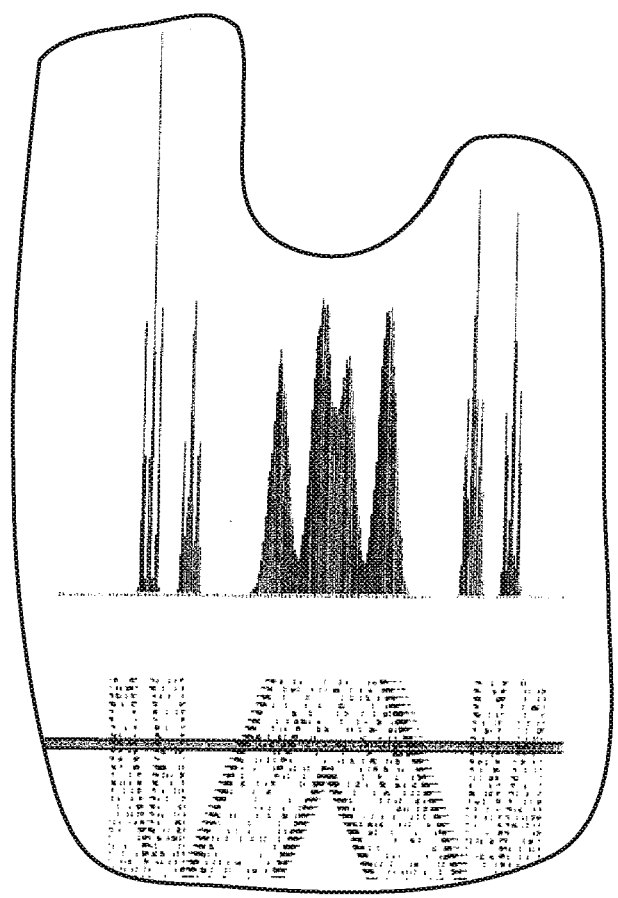
FIG. 7 shows a further diagram for illustrating a possible data analysis which can be performed by a method and apparatus according to the present invention.

FIG. 7 shows a further exemplary data analysis using the CSV file provided by a conversion unit of the measurement device 1. For a specific time or phase of the signal, a density structure of the eye diagram EP can be evaluated automatically providing a distribution as illustrated in FIG. 7.

Figure 8:
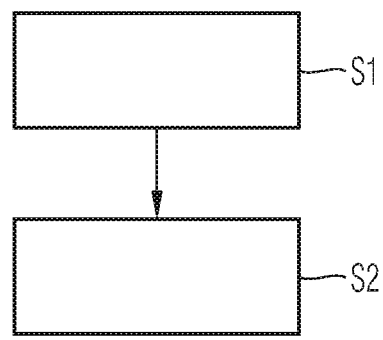
FIG. 8 shows a flowchart of a possible exemplary embodiment of a method for analyzing a transmission signal according to a further aspect of the present invention.

FIG. 8 shows a flowchart of a possible exemplary embodiment of a method for analyzing a transmission signal according to a further aspect of the present invention.

In a first step S1, a transmission characteristic is measured to provide an eye pattern EP of a transmission signal and/or a transmission channel.

In a further step S2, the provided eye pattern EP is converted automatically into a character separated values, CSV, file for further processing.

The generated CSV file provided in step S2 can comprise a body containing a histogram representing the eye pattern EP of a transmission signal and/or a transmission channel and a header containing information about the CSV file and its data body.

Figure 9:
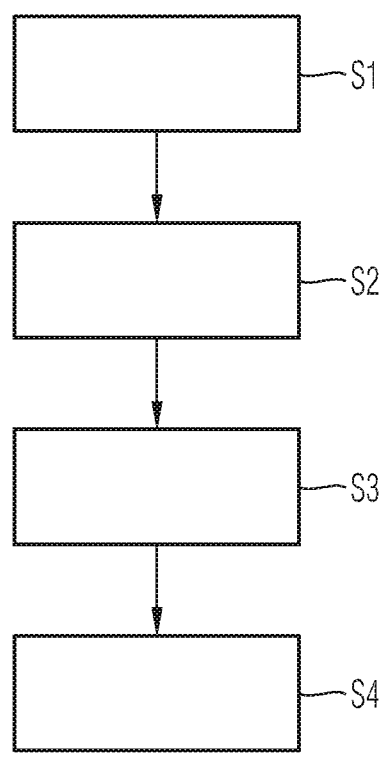
FIG. 9 shows a further flowchart for illustrating a possible exemplary embodiment of a method for analyzing a transmission signal according to an aspect of the present invention.

FIG. 9 shows a further exemplary embodiment of a method for analyzing a transmission signal or transmission channel. In the illustrated embodiment, the generated CSV file is analyzed automatically in step S3 by an executed application program to provide an analyzing result. The application program can be a spreadsheet application program such as EXCEL providing a spreadsheet view comprising cells each including a counter value. By reducing the optical spreadsheet view the eye pattern EP itself becomes visible. In a further step S4, an actor can be controlled depending on the analyzing result to influence or to adjust a measured transmission signal or transmission channel.

The CSV file provided in step S2 can be exported to a spreadsheet application program. The header and the data body of the CSV file comprises text lines which can be editable by a text editor. Accordingly, a user can view directly data transported in the CSV file to investigate the numbers of hits, e.g. occurrence frequency, of traces per pixel of the displayed eye pattern. In a further possible embodiment, the CSV file does not only comprise a data body containing a histogram representing the eye pattern of the transmission signal, but additionally individual signal traces or signal segments superimposed to generate the eye pattern EP. In this embodiment, it is possible to analyze different signal traces within the eye pattern individually. In a possible embodiment, the analyzing results can be used in a control loop as illustrated in FIG. 3 to control a subsystem of a technical system where transmissions signals are transported through a physical transmission channel.

In a further embodiment of the system according to the present invention, the analyzing results derived on the basis of the CSV files can be used to compare measurement device 1 with each other. For instance, a trusted measurement device can generate a reference CSV file of a test signal. The reference CSV file can then be compared with the CSV files exported by another measurement device to find differences between the CSV files. The measurement device 1 can be for instance a measurement device produced in a manufacturing process. By comparing a CSV file exported by the produced measurement device with the reference CSV file provided by the trusted measurement device, it is possible to perform a quality control of the produced measurement device. Further, it is possible to calibrate and/or adjust a parameter of the produced manufacturing device depending on the analyzing results provided by the analyzer 9 of the system.

With the system according to the present invention, it is possible to exchange CSV files between different measurement devices and/or analyzers to control and/or adjust parameters of transmission signals of a device under test 12 and/or a communication system. The system uses a universal data format allowing automatic analysis of different transmission signals for control purposes and/or quality control purposes. The generated CSV file can also be stored in a transportable data memory such as an USB stick.

The measurement device 1 can be an oscilloscope as illustrated in FIG. 10. The oscilloscope can for example measure an input signal S1 (t) and an output signal S2 (t) of a device under test DUT such as a low pass filter LPF. The oscilloscope can provide an eye pattern EP for the input signal S1 (t) and/or the output signal S2 (t).

The measurement device 1 can also be implemented in a network analyzer as illustrated in FIG. 11. The network analyzer measures transmission characteristics of a transmission channel or transmission elements such as a low pass filter LPF. The network analyzer can for instance determine the S-parameters of a device under test DUT as shown in FIG. 11. On the basis of the determined transmission characteristics of the DUT the effects of the DUT on any input signal applied to said DUT can be calculated to provide an eye pattern EP. The input signal can be a measured signal, a simulated signal or a signal read from a memory.

Figure 12:
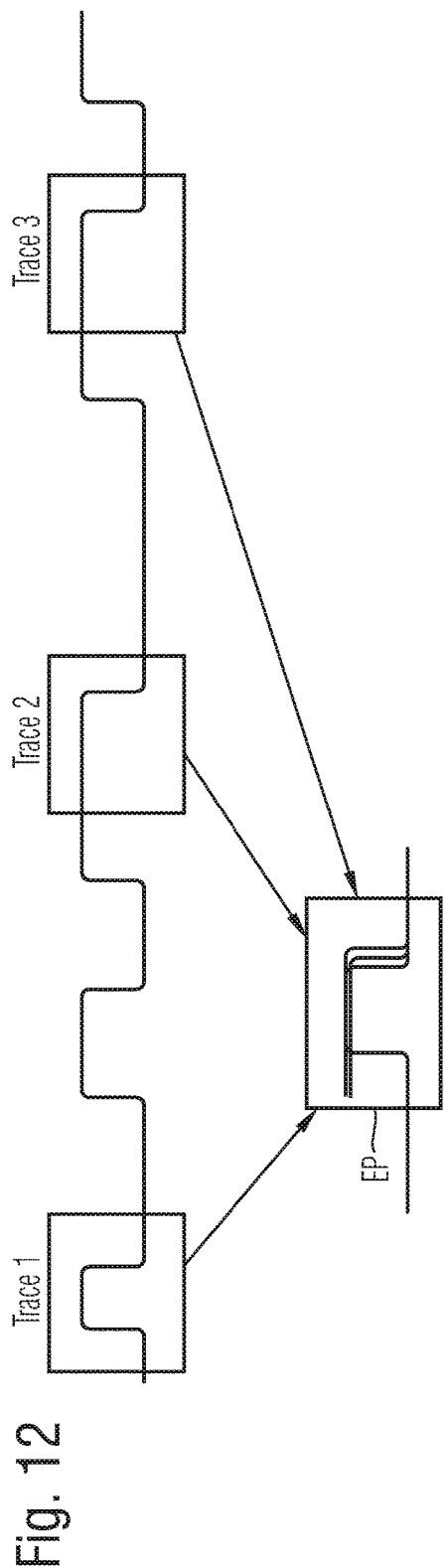
FIG. 12,13 illustrate the generation of an eye pattern from signal traces.
Figure 13:
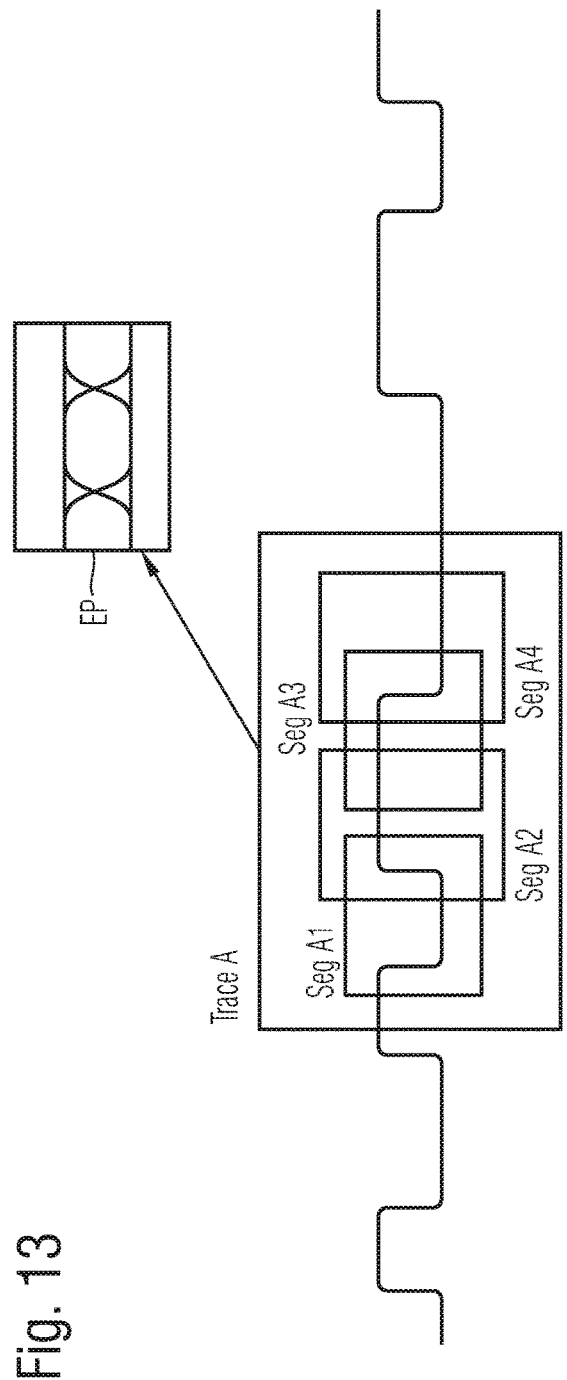

The eye diagram or eye pattern EP provided by the measurement unit 2 of the measurement device 1 can consist of multiple traces as illustrated in FIG. 12 or of a single trace at multiple segments as illustrated in FIG. 13. In the embodiment shown in FIG. 12 the measurement unit 2 takes several snapshots of the signals and superimposes these snapshots. In the embodiment shown in FIG. 13 the measurement unit 2 takes a long snapshot of the signal and dissects it into several segments which are then superimposed to form the eye pattern EP.

The invention claimed is:

1. A measurement device comprising:
one or more hardware processors configured to:
measure a transmission characteristic for providing an eye pattern;
draw the eye pattern on a screen in a drawing area divided in equally spaced bins of a two-dimensional histogram, wherein each bin of said two-dimensional histogram is represented by a counter value representing an occurrence frequency of signal traces of the measured transmission signal in the respective bin; and
convert automatically the eye pattern into a character separated values, CSV, file, wherein the body of the CSV file comprises lines including the counter values of the two-dimensional histogram separated by delimiters.

2. The measurement device according to claim 1, wherein the one or more processors are further configured to export the CSV file via a data interface and/or to import a CSV file received from another device via the data interface.

3. The measurement device according to claim 2, wherein said CSV file comprises a data body containing a histogram representing the eye pattern and a header containing information about the CSV file and its body.

4. The measurement device according to claim 1, wherein the provided eye pattern comprises a plurality of superimposed signal traces or superimposed signal segments of a measured or simulated transmission signal.

5. The measurement device according to claim 3, wherein the header and the body of the CSV file comprises text lines editable by a text editor.

6. The measurement device according to claim 1 further comprising a hardware processing unit configured to process the CSV file of the transmission signal for analyzing the eye pattern.

7. The measurement device according to claim 6, further comprising a hardware memory unit adapted to store the CSV file of the measured transmission characteristic for further processing by the hardware processing unit of said measurement device and/or for exporting the CSV file of the measured transmission characteristic via said data interface of said measurement device.

8. The measurement device according to claim 7, wherein said hardware processing unit is adapted to compare automatically the CSV file of the measured transmission characteristic with a CSV file imported by said measurement device via the data interface of said measurement device from another device.

9. The measurement device according to claim 7, wherein said hardware processing unit is adapted to execute an application program processing the CSV file of said measured transmission characteristic to analyze a transmission signal and/or a transmission channel.

10. The measurement device according to claim 9, wherein the application program is a spreadsheet application program providing a spreadsheet view of data within the data body of the CSV file, wherein the spreadsheet view is reducible to display the eye pattern.

11. The measurement device according to claim 1, further comprising a hardware probe adapted to tap a transmission signal from a physical transmission channel of a device under test.

12. A network analyzer comprising a measurement device comprising one or more hardware processors configured to:
   measure a transmission characteristic for providing an eye pattern;
   draw the eye pattern on a screen in a drawing area divided in equally spaced bins of a two-dimensional histogram, wherein each bin of said two-dimensional histogram is represented by a counter value representing an occurrence frequency of signal traces of the measured transmission signal in the respective bin; and
   automatically convert the eye pattern into a character separated values, CSV, file, wherein the body of the CSV file comprises lines including the counter values of the two-dimensional histogram separated by delimiters.

13. An oscilloscope comprising a measurement device comprising one or more hardware processors configured to:
   measure a transmission characteristic for providing an eye pattern;
   draw the eye pattern on a screen in a drawing area divided in equally spaced bins of a two-dimensional histogram, wherein each bin of said two-dimensional histogram is represented by a counter value representing an occurrence frequency of signal traces of the measured transmission signal in the respective bin; and
   convert automatically the eye pattern into a character separated values, CSV, file, wherein the body of the CSV file comprises lines including the counter values of the two-dimensional histogram separated by delimiters.

14. A system comprising at least one measurement device comprising one or more hardware processors configured to:
   measure a transmission characteristic for providing an eye pattern;
   draw the eye pattern on a screen in a drawing area divided in equally spaced bins of a two-dimensional histogram, wherein each bin of said two-dimensional histogram is represented by a counter value representing an occurrence frequency of signal traces of the measured transmission signal in the respective bin; and
   convert automatically the eye pattern into a character separated values, CSV, file, wherein the body of the CSV file comprises lines including the counter values of the two-dimensional histogram separated by delimiters.

15. The system according to claim 14, wherein said system comprises an analyzer connected to said at least one measurement device and comprising one or more hardware processors configured to analyze the transmission characteristic by processing an imported CSV file received from said measurement device.

16. The system according to claim 15, further comprising a controller comprising one or more hardware processors configured to control an actor depending on the analyzing result provided by the analyzer to influence a measured transmission signal and/or a transmission channel.

17. The system according to claim 15, wherein said processors of the analyzer are adapted to compare automatically imported CSV files received from different measurement device of said system measuring the same or different transmission signals transported through the same or different transmission channels.

18. A method for analyzing a transmission signal or transmission channel comprising:
   measuring a transmission characteristic to provide an eye pattern;
   drawing the eye pattern on a screen in a drawing area of a display unit divided in equally spaced bins of a two-dimensional histogram, wherein each bin of said two-dimensional histogram is represented by a counter value representing an occurrence frequency of signal traces of the measured transmission signal in the respective bin; and
   converting the provided eye pattern into a character separated values, CSV, file for further processing, wherein the body of the CSV file comprises lines including the counter values of the two-dimensional histogram separated by delimiters.

19. The method according to claim 18 wherein the CSV file comprises a body containing a histogram representing the eye pattern and a header containing information about the CSV file and its body.

* * * * *